United States Patent [19]

Yokota et al.

[11] Patent Number: 4,665,145

[45] Date of Patent: May 12, 1987

[54] COMPOSITE POLYMERIC MATERIAL COMPRISING VINYL CHLORIDE AND ORGANOSILICON MOIETIES AND A METHOD FOR THE PREPARATION THEREOF

[75] Inventors: Tohru Yokota, Ibaraki; Kaname Inoue, Kanagawa; Hajime Kitamura, Chiba; Kenichi Isobe; Shoji Ichinohe, both of Gunma; Takeji Yanagisawa, Ibaraki, all of Japan

[73] Assignee: Shin-Etsu Chemical Co., Ltd., Japan

[21] Appl. No.: 627,743

[22] Filed: Jul. 5, 1984

[30] Foreign Application Priority Data

Jul. 15, 1983 [JP] Japan .................. 58-128932

[51] Int. Cl.$^4$ .................... C08F 214/06; C08F 230/08
[52] U.S. Cl. .................... 526/279; 525/104; 525/209; 525/288; 526/345
[58] Field of Search .................. 526/279, 345

[56] References Cited

U.S. PATENT DOCUMENTS

| | | | |
|---|---|---|---|
| 2,865,899 | 12/1958 | Hurwitz et al. | 526/279 |
| 3,755,252 | 8/1973 | Büning et al. | 526/279 |
| 3,928,684 | 12/1975 | Büning et al. | 526/279 |
| 4,410,674 | 10/1983 | Ivani | 526/279 |
| 4,433,125 | 2/1984 | Ichinohe et al. | 526/279 |

FOREIGN PATENT DOCUMENTS

| | | | |
|---|---|---|---|
| 471543 | 6/1975 | Australia | 526/279 |
| 2059091 | 6/1971 | Fed. Rep. of Germany | 526/279 |
| 2046118 | 3/1972 | Fed. Rep. of Germany | 526/279 |
| 2255116 | 3/1973 | Fed. Rep. of Germany | 526/279 |
| 44-21103 | 9/1969 | Japan | 526/279 |
| 641268 | 8/1950 | United Kingdom | 526/279 |

*Primary Examiner*—Wilbert J. Briggs, Sr.
*Attorney, Agent, or Firm*—Toren, McGeady and Goldberg

[57] ABSTRACT

A composite polymeric material having a high permeability to oxygen is proposed comprising a vinyl chloride moiety, an organosilicon moiety and, optionally, a third polymeric moiety. Such a composite polymeric material can be prepared in several ways including copolymerization of vinyl chloride monomer, a polymerizable organosilicon compound and, optionally, a third monomer, graft-polymerization of a polymerizable organosilicon compound on to a polyvinyl chloride resin, graft-polymerization of vinyl chloride on to an organopolysiloxane, graft-copolymerization of vinyl chloride and a polymerizable organosilicon compound on to a third polymer and blending of the respective polymeric components.

1 Claim, No Drawings

COMPOSITE POLYMERIC MATERIAL COMPRISING VINYL CHLORIDE AND ORGANOSILICON MOIETIES AND A METHOD FOR THE PREPARATION THEREOF

BACKGROUND OF THE INVENTION

The present invention relates to a composite polymeric material comprising vinyl chloride and organosilicon moieties in combination and a method for the preparation thereof. More particularly, the invention relates to a composite polymeric material comprising vinyl chloride and organosilicon moieties in combination having a high gas permeability or, in particular, high oxygen permeability but yet free from the problem of bleeding of the plasticizer contained therein and a method for the preparation of such a composite polymeric material.

In recent years, as is well known, there is a rapidly growing demand for gas- or oxygen-permeable polymeric materials. Such a material is used, for example, in the blood transfusion or solution infusion and blood purifying unit of an artificial blood dialysis and an artificial heart-and-lung system for surgical operations including blood and solution bags and catheters, contact lenses and other medical instruments. Some of fresh foods must be stored under an atmospheric condition in a package rich in the oxygen content since otherwise the still living tissues of plants or animals of the foods rapidly decay in an atmosphere lean in the oxygen content during storage so that the material of the package should desirably be highly oxygen-permeable.

Needless to say, oxygen permeability of various polymeric materials widely differs from one to the other. For example, low-density polyethylenes reportedly have a relatively high oxygen permeability of 190 ml.mm/m$^2$.atm.24 hours while high-density polyethylenes have an oxygen permeability of only 27 in the same unit. Polyvinylidene chloride resins are known to have a further small oxygen permeability. At any rate, the oxygen permeability of these polymeric materials is quite insufficient as an oxygen-permeable polymeric material usable, for example, for the gas or material exchange membrane for blood purification.

Polyvinyl chloride resins, on the other hand, are known to have an outstandingly high oxygen permeability when the resin is plasticized with a large amount of a plasticizer. For example, it is reported that a polyvinyl chloride resin plasticized with 55 phr (parts per 100 parts of the resin) of dioctyl phthalate plasticizer has an oxygen permeability of as high as 309 in the same unit as above. Unfortunately, such a highly plasticized polyvinyl chloride resin cannot be used in most applications due to the safety problem despite the excellent physical and chemical properties inherent to polyvinyl chloride resins. That is, the plasticizer impregnating the polyvinyl chloride resin bleeds on the surface of the resin article unavoidably contaminating the substances in contact with the plasticized polyvinyl chloride resin while plasticizers are generally toxic against living bodies as is the serious concern in recent years. Therefore, the use of a plasticized polyvinyl chloride resin in the above mentioned medical applications and as a material for food package is quite out of question. Beside the plasticized polyvinyl chloride resins, several highly oxygen-permeable polymeric materials are known in the art but none of them is sufficiently inexpensive to ensure wide application thereof in a practical use.

It is of course that the decrease in the amount of the plasticizer formulation in a polyvinyl chloride resin blend leads to the decrease in the danger of contamination with the plasticizer. This way is, however, not practical because the oxygen permeability of a plasticized polyvinyl chloride resin rapidly decreases as the amount of the plasticizer is decreased reaching, for example, an extremely low value of only 2.9 in the same unit as above in an unplasticized polyvinyl chloride resin in addition to the loss of the flexibility possessed by a polyvinyl chloride resin when it is plasticized.

Several attempts have been made, of course, to solve this problem, for example, by the use of a polymeric plasticizer having less tendency toward bleeding and migration or less toxicity or by the techniques of copolymerization of vinyl chloride with one or more comonomers having a plasticizing effect in the copolymeric resin increasing the oxygen permeability of the resin. For example, a terpolymeric resin of vinyl chloride, ethylene and vinyl acetate is sold on the market as an oxygen-permeable polymer but the oxygen permeability of one of the commercially available resins of this type is 191 in the same unit as above not to be high enough to satisfy the demand in the practicl uses. The results obtained by using a polymeric plasticizer is also not better than above.

Thus, no polymeric material is known in the prior art to meet the diversified requirements in the medical science and foodstuff industry in connection with the oxygen permeability and the problem of plasticizer bleeding.

SUMMARY OF THE INVENTION

It is therefore an object of the present invention to provide a novel polymeric material having a high oxygen permeability and freed from the above described problems and disadvantages in the conventional oxygen-permeable polymeric materials of prior art.

Another object of the invention is to provide a novel polymeric material based on vinyl chloride or polyvinyl chloride having a high oxygen permeability even without a formulation of a plasticizer to exceed the oxygen permeability of plasticized polyvinyl chloride resins.

Thus, the vinyl chloride-based composite polymeric material of the invention having a high oxygen permeability comprises a combination of:

(a) from 50 to 90 parts by weight of a vinyl chloride moiety; and (b) from 1 to 50 parts by weight of an organosilicon or, in particular, organopolysiloxane moiety.

It is optional that the polymeric material as a combination of the components (a) and (b) further comprises (c) a third polymeric moiety in combination in an amount up to 50% by weight of the total amount of the components (a) and (b).

It should be noted that there can be several ways in which the above mentioned components (a), (b) and, optionally, (c) are combined together to form the oxygen-permeable polymeric material of the invention as described below for the exemplification of the embodiments.

(1) Vinyl chloride monomer and an organosilicon compound, which may be an organosilane or an organopolysiloxane, having at least one ethylenically unsaturated polymerizable group, e.g. vinyl group, bonded to the silicon atom in a molecule are copolymerized in the specified proportion to give, respectively, the vinyl chloride moiety and the organosilicon moiety in the resultant copolymer. The copolymerization may be performed with addition of a third monomer which should give the third polymeric moiety (c) in the copolymer.

(2) A graft polymerization of an organosilicon compound having at least one ethylenically unsaturated polymerizable group bonded to the silicon atom in a molecule is performed to provide the organosilicon moiety grafted to a polyvinyl chloride as the vinyl chloride moiety in the resultant graft copolymer. One or more of third monomers other than the above mentioned organosilicon compounds and vinyl chloride may pertain to the graft copolymerization to provide the third polymeric moiety (c) in the resultant graft copolymer.

(3) Graft polymerization is performed with vinyl chloride monomer and an organosilicon compound having at least one ethylenically unsaturated polymerizable group bonded to the silicon atom in a molecule simultaneously or successively to provide the vinyl chloride moiety and the organosilicon moiety, respectively, on to a polymer which constitutes the third polymeric moiety (c) in the resultant graft copolymer. In this case, the third polymeric moiety (c) is an indispensable component in the inventive polymeric material.

(4) Vinyl chloride monomer is graft-polymerized on to an organopolysiloxane to provide the vinyl chloride moiety and the organosiloxane moiety, respectively, in the resultant graft copolymer. One or more of third monomers other than vinyl chloride and unsaturation-containing organosilicon compounds may pertain to the graft polymerization to provide the third polymeric moiety (c) in the inventive polymeric material.

(5) A polyvinyl chloride resin and an organopolysiloxane are blended to provide the vinyl chloride moiety and the organosiloxane moiety, respectively, in the resultant polymer blend as the inventive polymeric material. If desired, a third polymeric material other than polyvinyl chloride resins and organopolysiloxanes may be blended together to provide a ternary polymer blend. It is of course optional that the copolymer or graft copolymer obtained in the above described embodiments (1) to (4) is further blended with a third polymeric material to provide the third polymeric moiety (c) in the resultant polymer blend.

(6) Either one of the polymeric materials described in (1) to (4) above or a copolymer of an organopolysiloxane moiety and a third polymeric moiety is further blended with a polyvinyl chloride resin.

The thus prepared polymeric material of the invention has a high oxygen permeability along with improved permeabilities to several other gases such as carbon dioxide, hydrogen, water vapor, nitrogen and the like so that the inventive material is useful in a diversity of applications in which permeation of one or more of specific gases is desired.

DETAILED DESCRIPTION OF THE PREFERRED EMBODIMENTS

In the following, the preparation of the oxygen-permeable polymeric materials of the invention is described in detail in the procedures (1) to (6) given above.

In the above described procedures (1) to (3) for the preparation of the inventive composite polymeric material, copolymerization or graft polymerization is performed of an organosilicon compound having at least one ethylenically unsaturated linkage per molecule with vinyl chloride monomer or on to a polyvinyl chloride or a third polymeric material. Such an organosilicon compound may be an organosilane or an organopolysiloxane compound and exemplary of such an organosilicon compound are those expressed by the following names or formulas (S-1) to (S-48), in which the symbols Me, Et, Pr, Ph, Vi and Ip each denote a methyl group $-CH_3$, ethyl group $-C_2H_5$, propyl group $-C_3H_7$, phenyl group $-C_6H_5$, vinyl group $-CH=CH_2$ and isopropenyl group $-CMe=CH_2$, respectively:

(S-1): $Ip-CO-O-C_3H_6-Si(-O-SiMe_3)_3$;
(S-2): $Ip-CO-O-C_3H_6-Si(-O-SiMe_3)_2-O-Si(-O-SiMe_3)_2-C_3H_6-O-CO-Ip$;
(S-3): $Ip-CO-O-C_3H_6-SiMe_2-O(-SiMe_2-O)_{10}-SiMe_2-C_3H_6-O-CO-Ip$;
(S-4): $Vi-SiMe_2-O(-SiMe_2-O)_{40}-SiMe_2-Vi$;
(S-5): $Vi-SiMe_2-O-SiMe_2-Vi$;
(S-6): $Vi-SiMe_2-O(-SiMe_2-O)_{300}(SiMeVi-O)_{10}-SiMe_2-Vi$;
(S-7): $Vi-CO-O-CH_2-SiMe_2-O-SiMe_3$;
(S-8): $Ip-CO-O-CH_2-CHOH-CH_2-O-C_3H_6-Si(Me)(-O-SiMe_3)_2$;
(S-9): $(Me_3Si-O-)_3Si-C_3H_6-O-CO-CH=CH-CO-O-C_3H_6-Si(-O-SiMe_3)_3$;
(S-10): $(Me_3Si-O-)_3Si-C_3H_6-O-CO-C(=CH_2)-CH_2-CO-O-C_3H_6-Si(-O-SiMe_3)_3$;
(S-11): $Q-Si[(-O-SiMe_2-)_{20}O-SiMe_3]_3$, in which Q is a maleimido group;
(S-12): $Ip-CO-O-C_3H_6-SiMe_2-O-SiMe_2-CH_2-CHMe-Ph$;
(S-13): $Vi-CO-O-CH_2-SiMe_2-O-SiPh_3$;
(S-14): $Ip-CO-O-C_3H_6(-SiMe_2-O)_3 SiMe_2-Pr$;
(S-15): $Vi-CH_2-Si(-O-SiMe_3)_2-O-SiMe_2-O-SiMe_3$;
(S-16): $Ip-CO-O-C_3H_6-Si[(-O-SiMe_2)_6 O-SiMe_3]_3$;
(S-17): 1,3,5,7-Tetramethyl-1,3,5,7-tetravinyl cyclotetrasiloxane;
(S-18): Vinyl tris(trimethylsiloxy)silane;
(S-19): $Vi-CH_2-O-CH_2-CHOH-CH_2-O-C_3H_6-Si(-O-SiMe_3)_3$;
(S-20): $HO(-SiMe_2-O)_n(SiMeVi-O)_m H$, in which n is a positive integer large enough to give the compound a viscosity of about 25,000 centipoise at 25° C.;
(S-21): $Vi-SiMe_2-O(-SiMe_2-O)_m SiMe_2-Vi$, in which m is a positive integer sufficiently large to give the compound a viscosity of about 400,000 centipoise at 25° C.;
(S-22): $Vi-SiMe_2-O(-SiMe_2-O)_{19p}(SiMePh-O)_p SiMe_2-Vi$, in which p is a positive integer sufficiently large to give the compound a viscosity of about 200,000 centipoise at 25° C.;
(S-23): $Vi-SiMe_2-O(-SiMe_2-O)_{19q}(SiMeVi-O)_q SiMe_2-Vi$, in which q is a positive integer sufficiently large to give the compound a viscosity of about 20,000 centipoise at 25° C.;
(S-24): $Ip-CO-O-CH_2-SiMe_3$;
(S-25): $Vi-CO-O-CH_2-SiMe_2-O-SiMe_3$;
(S-26): $Ip-CO-O-C_3H_6-SiMe_2-O-SiMe_2-C_2H_4-SiMe_3$;
(S-27): $Vi-CO-O-C_2H_4(-SiMe_2-O)_3 SiMe_3$;
(S-28): $Vi-CO-O-C_2H_4-SiMe_2-O-SiMe_2-CH_2-CHMe-Ph$;
(S-29): $Vi-CO-O-C_2H_4-SiEtPh-O-SiEt_3$;

(S-30): Ip—CO—O—C₃H₆—Si[(—O—SiMe₂)₅₀—O—SiMe₃]₃;
(S-31): Ip—CO—O—C₃H₆—SiMe₂—O(—O—SiMe₂)₈₀—O—SiMe₃;
(S-32): Ip—CO—O—CH₂—SiMe(—O—SiMe₃)₂;
(S-33): Vi—CO—O—CH₂—Si(—O—SiMe₃)₂—O—SiMe₂—O—SiMe₃;
(S-34): Ip—CO—O—CH₂—CHMe—CH₂—Si(—O—SiMe₃)₃;
(S-35): Vi—CO—O—CMe₂—CH=CH—Si(—O—SiMe₃)₃;

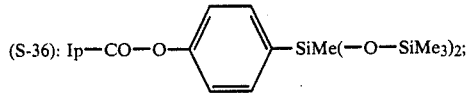

(S-36): Ip—CO—O—⟨C₆H₄⟩—SiMe(—O—SiMe₃)₂;

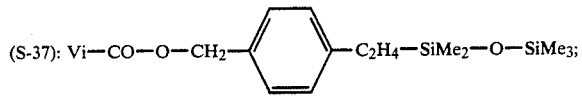

(S-37): Vi—CO—O—CH₂—⟨C₆H₄⟩—C₂H₄—SiMe₂—O—SiMe₃;

(S-38): Ip—CO—NH—CH₂—CHOH—CH₂—O—C₃H₆—Si(—O—SiMe₃)₃;
(S-39): Ip—CO—O—CH₂—CHOH—CH₂—NH—C₃H₆—SiMe(—O—SiMe₃)₂;
(S-40): Ip—CO—O—CH₂—CHOH—CH₂—NH—C₃H₆—Si[(—O—SiMe₂)₁₀—O—SiMe₃]₃;
(S-41): Ip—CO—O—CH₂—CHOH—CH₂—NH—C₃H₆—SiMe₂—O—SiMe₂—C₂H₄—SiMe₃;
(S-42): (Me₃Si—O—)₂SiMe—C₃H₆—O—CO—CH=CH—CO—O—C₃H₆—SiMe(—O—SiMe₃)₂;
(S-43): [Me₃Si—O(—SiMe₂—O)₅]₃Si—C₃H₆—NH—CO—CH=CH—CO—NH—C₃H₆—Si[(—O—SiMe₂)₅SiMe₃]₃;
(S-44): Me₃Si—O—SiMe₂—C₃H₆—NH—CO—C(=CH₂)—CH₂—CO—NH—C₃H₆—SiMe₂—O—SiMe₃;
(S-45): Me₃Si—CH₂—O—CO—C(=CH₂)—CH₂—CO—O—CH₂—SiMe₃;
(S-46): (Me₃Si—O—)₃Si—C₃H₆—O—CO—CH(=CH₂)—CH₂—CO—O—C₃H₆—Si(—O—SiMe₃)₃;
(S-47): Q—C₂H₄—NH—C₃H₆—Si(—O—SiMe₃)₃, in which Q is a maleimido group; and
(S-48): Q—CH₂—SiMe₃, in which Q has the meaning as defined above.

In the above described embodiment (4) in which vinyl chloride monomer is graft-polymerized on to a base polymer of organopolysiloxane, the organopolysiloxane suitable for the purpose is exemplified, in addition to the above given organopolysiloxanes, by the following compounds:

(S-49): Me₃Si—O(—SiMe₂—O)ᵣ—SiMe₃, in which r is a positive integer sufficiently large to give the compound a viscosity of about 10,000 centistokes at 25° C.;
(S-50): Me₃Si—O(—SiMe₂—O)₅₀₀(—SiHMe—O)₅SiMe₃;
(S-51): Et—O(—SiMe₂—O)₅₁Et;
(S-52): HO—C₂H₄—O—C₃H₆(—SiMe₂—O)₇₅SiMe₂—C₃H₆—O—C₂H₄OH;
(S-53):

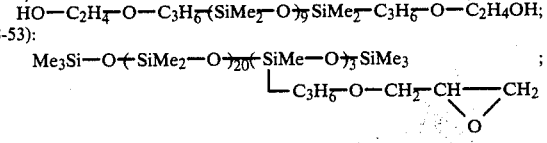

Me₃Si—O(—SiMe₂—O)₁₂₀(—SiMe—O)₅SiMe₃
            |
            C₃H₆—O—CH₂—CH—CH₂
                        \ /
                         O (S-54):

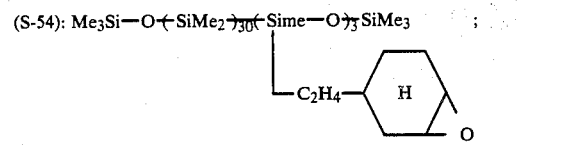

Me₃Si—O(—SiMe₂)₃₀(—Sime—O)₅SiMe₃
            |
            C₂H₄—⟨cyclohexyl with H, O⟩

(S-55): Me₃Si—O(—SiMe₂—O)₇₅SiMe₃;
(S-56): 1,5-Dimethyl-1,1,3,3,5,5-hexaphenyltrisiloxane; and (S-57):

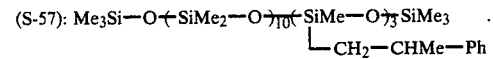

Me₃Si—O(—SiMe₂—O)₁₀(—SiMe—O)₅SiMe₃
            |
            CH₂—CHMe—Ph

Among the above exemplified polymerizable organosilicon compounds, particularly preferable compounds are classified into the following types (I) to (IV).

(I) An organosilicon compound represented by the general formula $CH_2=CR^1-CO-R^2-SiG_{2-n}(-O-SiR_2)_nR^3$, in which $R^1$ is a hydrogen atom or an alkyl group having 1 to 3 carbon atoms, $R^2$ is a divalent organic group, G is a monovalent hydrocarbon group having 1 to 20 carbon atoms or an organosiloxy group represented by the general formula $(-O-SiR_2)_nR^3$, R is a monovalent hydrocarbon group having 1 to 20 carbon atoms or a trimethylsiloxy group, $R^3$ is a monovalent hydrocarbon group having 1 to 20 carbon atoms, a trimethylsiloxy group or a silyl-substituted ethyl group represented by the general formula $-CH_2-CH_2-SiR_2(-O-SiR_2)_nR^3$ and n is zero or a positive integer not exceeding 100.

(II) An organosilicon compound represented by the general formula ACH=CHA, which may be cis or a trans isomer in respect of the steric configuration and in which A is a silicon-containing group represented by the general formula $-CO-R^2-SiG_2(-O-SiR_2)_nR^3$, the symbols R, $R^2$, $R^3$, G and n each having the same meaning as defined above.

(III) An organosilicon compound represented by the general formula $CH_2=CA-CH_2-A$, in which the symbol A has the same meaning as defined above.

(IV) A maleimido-containing organosilicon compound represented by the general formula $Q-R^2-SiG_2(-O-SiR_2)_nR^3$, in which the symbols R, $R^2$, $R^3$, G and n each have the same meaning as defined above and Q is a maleimido group.

When the composite polymeric material of the invention comprises the third polymeric moiety (c) in addition to the vinyl chloride and organosilicon moieties as in the above described combinations of the types (1), (2) and (4), such a third polymeric moiety should be obtained by the polymerization of a third monomer, which is exemplified by α-olefins, vinyl ethers, vinyl esters, acrylic esters, methacrylic esters, maleic esters, fumaric esters, allyl esters, allyl ethers and the like.

When the combination of the polymeric moieties (a), (b) and (c) is a type (3) or (5) described above, the third polymeric moiety (c) should be an already-polymerized polymer which is exemplified by copolymers of ethylene and vinyl acetate, copolymers of ethylene, vinyl acetate and carbon monoxide, copolymers of vinyl chloride with vinyl acetate, ethylene, propylene and the like, copolymers of ethylene and an acrylic ester, vinyl chloride-based multicomponent polymers obtained, for example, by the graft polymerization of vinyl chloride on an ethylenic polymer, e.g. chlorinated polyethylene, and the like.

The copolymerization and graft polymerization, to which one or more of the monomeric components, i.e., vinyl chloride, the above described polymerizable organosilicon compounds and, optionally, one or more of the third monomers, pertain, is carried out by forming a mixture containing the same and subjecting the mixture to a free radical polymerization in the presence of a free radical polymerization initiator according to a conventional polymerization procedure such as suspension polymerization, emulsion polymerization, solution polymerization and bulk polymerization. The polymerization initiator may be any one of known initiators or initiator systems including organic peroxides, azo compounds and redox catalyst systems for polymerization.

When the polymerization is performed in a procedure of suspension polymerization, for example, the vinyl chloride monomer and the polymerizable organosilicon compound are suspended in an aqueous medium with admixture of a suitable polymerization initiator, e.g. organic peroxide, and the polymerization is carried out at a temperature of 30° to 120° C. for 1 to 30 hours. It is of course not essential that the polymerizable organosilicon compound and the optional third monomer are introduced into the polymerization mixture at one time before the start of the polymerization run but they can be introduced portion-wise or continuously up to a moment when the conversion of the vinyl chloride monomer has reached several tens of %.

The weight proportion of the vinyl chloride monomer and the polymerizable organosilicon compound in the above mentioned copolymerization should be in such a range that from 1 to 50 parts by weight of the polymerizable organosilicon compound are taken per 50 to 99 parts by weight of the vinyl chloride monomer. This is because no sufficiently high gas, e.g. oxygen, permeability is obtained when the amount of the polymerizable organosilicon compound is too small while the mechanical properties of the resultant copolymer are poor when an excessively large amount of the polymerizable organosilicon compound is used. When a third monomer is used in combination, the amount thereof should not exceed 50 parts by weight.

When the inventive composite polymeric material is a graft copolymer obtained by different combinations of a base polymer and a monomer to be grafted to the former, the procedure for the graft copolymerization by use of a free radical polymerization initiator is carried out according to a method well known in the art. When it is desired to carry out the graft polymerization of a polymerizable organosilicon compound on to a polyvinyl chloride resin in a homogeneous phase, the polyvinyl chloride resin is dissolved in a suitable organic solvent and a polymerization initiator, e.g. an organic peroxide, and the polymerizable organosilicon compound are dissolved in the solution which is heated to effect graft copolymerization of the organosilicon compound on to the base polymer of polyvinyl chloride. When a heterogeneous phase reaction is undertaken, the polyvinyl chloride resin is soaked with the polymerizable organosilicon compound in a liquid form containing the polymerization initiator with or without a solvent and the blend is heated as such or after kneading in a suitable kneading machine. The graft copolymerization is carried out at a temperature of 30° to 120° C. for 1 to 30 hours.

When the inventive composite polymeric material is a graft copolymer prepared by the graft polymerization of vinyl chloride monomer on to the base polymer of a suitable organopolysiloxane, the free radical polymerization is performed in the presence of the organopolysiloxane. In this case, the organopolysiloxane may not have an ethylenically unsaturated polymerizable group or the organopolysiloxane per se can be an unpolymerizable one.

It should be noted that the graft copolymerization of vinyl chloride monomer on to the organopolysiloxane can take place even when the organopolysiloxane has one or more of the polymerizable organic groups exemplified by the organosilicon compounds (S-1) to (S-48). In this case, copolymerization of vinyl chloride monomer and the polymerizable organopolysiloxane and the graft copolymerization naturally take place concurrently so that no clear demarcation can be given between these two types of the combination of the vinyl chloride and organosilicon moieties. When the polymerizable organopolysiloxane has a relatively large molecular chain length having the polymerizable groups as the pendant groups, in particular, the copolymerization itself is a type of graft polymerization.

When the composite polymeric material of the invention is a graft polymer on a base polymer other than polyvinyl chloride and organopolysiloxane, such a graft polymer is obtained by the simultaneous or successive two graft polymerizations of vinyl chloride monomer and a polymerizable organosilicon compound on to a base polymer which constitutes the third polymereic moiety in the resultant graft copolymer. The procedure for the graft polymerization is similar to the graft polymerization on to a polyvinyl chloride as the base polymer.

The polymer blend according to the combination of the polymeric moieties (5) or (6) described above can be prepared by any known method using a roller mill, kneader, extruder and the like blending machine.

It is of course optional that the composite polymeric material of the invention is further admixed according to need with conventional additives including, for example, liquid plasticizers, stabilizers, antioxidants, fillers, lubricants, coloring agents and the like each in an adequate amount not to have an adverse effect on the desired properties of the composite polymeric material.

In the following, the composite polymeric materials of the invention as well as the method for the preparation thereof are described in detail by way of examples.

EXAMPLE 1

Into a stainless steel-made polymerization reactor of 50 liters capacity were introduced 30 kg of purified water, 12 kg of vinyl chloride monomer, 20 g of a partially saponified polyvinyl alcohol, 7.5 g of di-2-ethylhexylperoxy dicarbonate and 3 kg of a polymerizable organosilicon compound (S-1) to form a polymerization mixture and the suspension copolymerization of vinyl chloride and the organosilicon compound was performed by heating the mixture under agitation at 52° C. for 20 hours. After completion of polymerization, the polymerizate slurry was discharged out of the polymerization reactor and dehydrated and dried to give a vinyl chloride-based copolymer.

The result of the analysis of this copolymer for the content of chlorine indicated that the content of the organosilicon compound (S-1) therein was 21.0% by weight. The extraction of this copolymer with methyl alcohol in a Soxhlet extractor gave 0.34% by weight of an oily matter which was identified presumably to be the unreacted organosilicon compound or an oligomer thereof by the infrared absorption spectroscopy showing absence of polyvinyl chloride. Further extraction of the copolymer with n-hexane in the Soxhlet extractor after the above mentioned extraction with methyl alcohol gave a polymeric extracted material in an amount corresponding to 3.1% by weight based on the initial weight of the copolymer. This material was presumably a homopolymer of the organosilicon compound.

The average degree of polymerization of this copolymeric resin was determined assuming applicability of the method specified in JIS K 6271 to give a result of about 1320. The oxygen permeability P of this copolymeric resin was 1200 ml.mm/m$^2$.atm.24 hours as determined by the method described below while the value of P of a commercial product of a polyvinyl chloride resin having an average degree of polymerization of about 1300 was 430 in the same unit by the same testing procedure.

Determination of permeability to oxygen: a resin compound was prepared by milling a mixture composed of 100 parts by weight of the resin under testing, 50 parts by weight of di-2-ethylhexyl phthalate, 1.5 parts by weight of dioctyltin mercaptide, 1.0 part by weight of calcium stearate and 0.3 part by weight of a polyethylene wax for 10 minutes in a 6-inch roller mill heated at 160° C. and the resin compound was compression-molded at 170° C. into a sheet of 0.5 mm thickness, of which the permeability to oxygen was determined by use of a full-automatic gas permeability tester.

EXAMPLE 2

A copolymer of vinyl chloride and a polymerizable organosilicon compound was prepared in substantially the same manner as in Example 1 excepting the replacement of the organosilicon compound (S-1) with (S-8). The analytical results of this copolymer were as follows: content of the organosilicon compound 20.5% by weight; methyl alcohol-extractable matter 0.15% by weight; n-hexane-extractable matter 1.5% by weight; and average degree of polymerization 1460. The oxygen permeability of this copolymer determined by the procedure given below was 60 ml.mm/m$^2$.atm.24 hours while the value of a commercial product of a polyvinyl chloride resin having an average degree of polymerization of about 1300 was 5.0 in the same unit by the same testing procedure.

Determination of oxygen permeability: a resin compound was prepared by uniformly milling a mixture composed of 100 parts by weight of the resin under testing, 1.0 part by weight of dioctyltin mercaptide, 0.5 part by weight of calcium stearate and 0.3 part by weight of a polyethylene wax for 10 minutes in a 6-inch roller mill heated at 160° C. and the resin compound was compression-molded at 170° C. into a sheet of 0.5 mm thickness, of which the permeability to oxygen was determined by use of a full-automatic gas permeability tester.

EXAMPLE 3

A copolymer was prepared in substantially the same manner as in Example 1 in a stainless steel-made polymerization reactor of 50 liters capacity by the suspension polymerization with a mixture composed of 30 kg of pure water, 12 kg of vinyl chloride monomer, 1.5 kg of methyl methacrylate, 1.5 kg of a polymerizable organosilicon compound (S-46), 20 g of a partially saponified polyvinyl alcohol and 7.5 g of di-2-ethylhexylperoxy dicarbonate.

The results with this copolymer in the analysis and determination of the permeability to oxygen by the same procedure as in Example 2 were as follows: total content of methyl methacrylate and the organosilicon compound 20.5% by weight; methyl alcohol-extractable matter 0.17% by weight; n-hexane-extractable matter 0.55% by weight; and permeability to oxygen 53 ml.mm/m$^2$.atm.24 hours.

EXAMPLES 4 to 25

Into a stainless steel-made polymerization reactor of 2 liters capacity were introduced 1000 g of pure water, 0.7 g of a partially saponified polyvinyl alcohol, 0.25 g of di-2-ethylhexylperoxy dicarbonate and 500 g of a combination of monomers composed of vinyl chloride monomer, one or two of the polymerizable organosilicon compounds and, optionally, a third monomer other than vinyl chloride and polymerizable organosilicon compounds shown in Table 1 below in a proportion also given in the table. The polymerization of the monomers was performed in the same manner as Example 1 and the permeability of the thus obtained copolymer to oxygen was examined in the same manner as in Example 2 to give the results shown in Table 1.

TABLE 1

| Example No. | Monomers copolymerized with vinyl chloride (% by weight*) | | Permeability to oxygen, ml · mm/m$^2$ · at m · 24 hours |
|---|---|---|---|
| | Polymerizable organosilicon compound | Third monomer | |
| 4 | S-24 (5); S-1 (10) | — | 350 |
| 5 | S-26 (20) | — | 530 |
| 6 | S-1 (10); S-30 (5) | — | 920 |
| 7 | S-1 (10); S-28 (5) | — | 180 |
| 8 | S-30 (10) | — | 760 |
| 9 | S-31 (10) | — | 520 |
| 10 | S-14 (20) | — | 650 |
| 11 | S-37 (10) | — | 35 |
| 12 | S-8 (10) | Butyl methacrylate (10) | 30 |
| 13 | S-38 (10) | — | 35 |
| 14 | S-39 (10) | — | 40 |
| 15 | S-9 (10) | — | 120 |
| 16 | S-42 (10) | Dibutyl fumarate (10) | 105 |
| 17 | S-46 (10) | — | 130 |
| 18 | S-11 (10) | Diethyl maleate (10) | 460 |
| 19 | S-48 (10) | Butyl methacrylate (10) | 80 |
| 20 | S-1 (5); S-31 (15) | — | 1400 |
| 21 | S-1 (5); S-30 (15) | — | 1200 |
| 22 | S-30 (10) | Butyl methacrylate (10) | 650 |
| 23 | S-1 (5); S-30 (10) | Butyl methacrylate (5) | 700 |
| 24 | S-31 (20) | Dibutyl fumarate (5) | 1250 |
| 25 | S-1 (20) | Diethyl maleate (20) | 530 |

*The balance is vinyl chloride monomer.

EXAMPLE 26

Into a stainless steel-made polymerization reactor of 50 liters capacity were introduced 30 kg of pure water, 12.75 kg of vinyl chloride monomer, 2.14 kg and 0.11 kg of the polymerizable organosilicon compounds (S-1) and (S-2), respectively, 20 g of a partially saponified polyvinyl alcohol and 7.5 g of di-2-ethylhexylperoxy dicarbonate and the polymerization mixture was heated under agitation up to 52° C. where the copolymerization of the monomers was performed for 20 hours. The polymerizate discharged out of the reactor after completion of the polymerization was dehydrated and dried to give a vinyl chloride-based copolymeric resin.

The content of the vinyl chloride units in this copolymeric resin was 81.2% by weight as calculated from the analytical result for the chloride content. The average degree of polymerization thereof was 1320 assuming the applicability of the method specified in JIS K 6271. Further, the permeability of this resin to oxygen was determined according to the procedure given below to give a result of 560 ml.mm/m$^2$.atm.24 hours. The corresponding value of a commercially available polyvinyl chloride resin having an average degree of polymerization of 1300 was only 5.1 in the same unit.

Determination of oxygen permeability: 100 parts by weight of the resin under testing were blended and milled with 10 parts by weight of an epoxidated soybean oil in a 6-inch roller mill at 160° C. for 10 minutes and the resin compound was compression-molded at 170° C. into a sheet of 0.5 mm thickness of which the permeability to oxygen was measured by use of a full-automatic gas permeability tester.

EXAMPLE 27

The procedure of the polymerization was substantially the same as in the preceding example excepting the formulation of the polymerization mixture which was composed of 30 kg of pure water, 10.5 kg of vinyl chloride monomer, 1.5 kg of 2-ethylhexyl acrylate, 2.85 kg and 0.15 kg of the polymerizable organosilicon compounds (S-1) and (S-5), respectively, 20 g of a partially saponified polyvinyl alcohol and 7.5 g of di-2-ethylhexylperoxy dicarbonate.

The copolymeric resin product was examined in the same manner as in the preceding example to give the results that the content of the vinyl chloride units and the average degree of polymerization of the copolymer were 69.0% by weight and about 1030, respectively, and the permeability of th resin sheet, which was roll-milled at 120° C. and compression-molded at 150° C., to oxygen was 880 in the same unit as in the preceding example.

EXAMPLE 28

The procedure of the polymerization was substantially the same as in the preceding example excepting the formulation of the polymerization mixture which was composed of 30 kg of pure water, 13.5 kg of vinyl chloride monomer, 1.5 kg, 15 g and 15 g of the polymerizable organosilicon compounds (S-1), (S-3) and (S-4), respectively, 1.5 g of diallyl maleate, 20 g of a partially saponified polyvinyl alcohol and 7.5 g of di-2-ethylhexylperoxy dicarbonate.

The thus prepared coplymeric resin was examined in the same manner as in the preceding example to give the results that the content of the vinyl chloride units and the average degree of polymerization were 88.3% by weight and about 1420, respectively, and the permeability to oxygen of the resin sheet prepared in the same manner as in Example 26 was 410 in the same unit as in the preceding example.

EXAMPLES 29 TO 40

A polyvinyl chloride-based resin blend was prpared by uniformly milling in a roller mill 4.5 or 4.0 parts by weight of a polyvinyl chloride resin having an average degree of about 1300, 0.5 or 1.0 part by weight of one of the polymerizable or unpolymerizable organosilicon compounds indicated in Table 2 below, the total amount of these two classes of the components being 5 parts by weight, and 2.0 parts by weight of a copolymer of ethylene and vinyl acetate containing about 35% by weight of the vinyl acetate units. The permeability of these resin sheets to oxygen were as shown in Table 2 as determined in the same manner as in Example 26. Table 2 also includes the comparative data obtained with a resin sheet prepared from 5.0 parts by weight of the same polyvinyl chloride resin and 2.0 parts by weight of the same ethylene-vinyl acetate copolymer.

TABLE 2

| Example No. | Polyvinyl chloride, parts by weight | Organosilicon compound (parts by weight) | Permeability to oxygen, ml · mm/ m$^2$ · atm · 24 hours |
|---|---|---|---|
| 29 | 4.5 | S-16 (0.5) | 320 |
| 30 | 4.0 | S-1 (1.0) | 150 |
| 31 | 4.5 | S-4 (0.5) | 300 |
| 32 | 4.0 | S-5 (1.0) | 100 |
| 33 | 4.0 | S-17 (1.0) | 160 |
| 34 | 4.0 | S-51 (1.0) | 140 |
| 35 | 4.0 | S-52 (1.0) | 120 |
| 36 | 4.0 | S-53 (1.0) | 180 |
| 37 | 4.0 | S-54 (1.0) | 200 |
| 38 | 4.0 | S-55 (1.0) | 120 |
| 39 | 4.0 | S-56 (1.0) | 65 |
| 40 | 4.0 | S-57 (1.0) | 95 |
| — | 5.0 | — | 20 |

EXAMPLES 41 TO 46

Into a four-necked flask of 2 liters capacity were introduced 500 g of n-hexane, 2.0 g of benzoyl peroxide, two or three kinds of the polymerizable or unpolymerizable organosilicon compounds indicated in Table 3 below and one or two kinds of ethylenically unsaturated monomers other than vinyl chloride and the polymerizable organosilicon compounds also indicated in Table 3 and copolymerization of the monomers was performed for 5 hours under refluxing. The resultant polymer solution was poured into a large excess of methyl alcohol to precipitate the copolymer, which was, after drying, blended with the same polyvinyl chloride resin as used in Example 29 in a weight ratio of 20:80 or 40:60.

Each of the resin blends was examined for the permeability to oxygen in the same manner as in Example 26 to give the results shown in Table 3.

EXAMPLES 47 TO 50

Into a four-necked flask of 2 liters capacity were introduced 350 g of a commercial product of polyvinyl chloride resin having an average degree of polymerization of 1300, 100 g and 1.5 g of the polymerizable organosilicon compounds (S-1) and (S-2), respectively, 50 g of 2-ethylhexyl methacrylate and 1.0 g of benzoyl peroxide and the mixture was heated and agitated at 100° C. for 3 hours to effect graft polymerization of the monomers on to the polyvinyl chloride resin (Example 47).

TABLE 3

| Example No. | Organosilicon compounds (taken, g) | Third monomers (taken, g) | Oxygen permeability, ml · mm/m$^2$ · atm · 24 hours, copolymer/PVC ratio | |
|---|---|---|---|---|
| | | | 20:80 | 40:60 |
| 41 | S-1 (250) | Methyl meth- | 60 | 250 |

TABLE 3-continued

| Example No. | Organosilicon compounds (taken, g) | Third monomers (taken, g) | Oxygen permeability, ml · mm/m² · atm · 24 hours, copolymer/PVC ratio 20:80 | 40:60 |
|---|---|---|---|---|
|  | S-2 (2.5) | acrylate (250) |  |  |
| 42 | S-1 (200) S-7 (50) | Methyl methacrylate (250) | 60 | 240 |
| 43 | S-1 (250) S-6 (1) | Vinyl acetate (250) | 100 | 350 |
| 44 | S-8 (200) S-12 (50) | 2-Ethylhexyl acrylate (50) Methyl methacrylate (200) | 125 | 500 |
| 45 | S-16 (200) S-9 (25) S-11 (25) | Vinyl acetate (200) Butyl vinyl ether (50) | 150 | 600 |
| 46 | S-1 (200) S-10 (50) S-23 (0.5) | Methyl methacrylate (250) | 130 | 550 |

Extraction of the thus obtained graft-polymerized resin with n-hexane gave 1.5% by weight of an extractable matter which was presumably the unpolymerized organosilicon compound (S-1). The graft-polymerized resin was compounded with an epoxidated soybean oil and shaped into a sheet in the same manner as in Example 26 to give a milky white sheet.

The same experimental procedure as above was repeated except that the organosilicon compounds (S-1) and (S-2) were replaced with 100 g of the organosilicon compound (S-15) (Example 48), with 40 g and 10 g of the organosilicon compounds (S-18) and (S-20), respectively (Example 49), or with 100 g and 2 g of the organosilicon compounds (S-14) and (S-6), respectively (Example 50).

Each of the thus obtained graft-polymerized resins was subjected to the measurement of the permeability to oxygen in the same manner as in Example 26 to give the results of 2100, 350, 420 and 1850 ml.mm/m².atm.24 hours for the sheets obtained in Examples 47, 48, 49 and 50, respectively.

EXAMPLES 51 to 57

Into a stainless steel-made polymerization reactor of 2 liters capacity were introduced 1000 g of pure water, 0.7 g of a partially saponified polyvinyl alcohol, 0.25 g of di-2-ethylhexylperoxy dicarbonate and several ingredients pertaining to the polymerization in a total amount of 500 g including vinyl chloride monomer, one or two of the organosilicon compounds and one or two of the monomeric or polymeric components providing the third moiety in the resultant copolymer other than the vinyl chloride and organosilicon moieties. The relative amount of these ingredients are given in Table 4 in % by weight, the balance being vinyl chloride monomer.

Each of the thus prepared copolymers was shaped into a sheet and subjected to the measurement of the permeability to oxygen in the same manner as in Example 26 to give the results shown in Table 4.

TABLE 4

| Example No. | Organosilicon compound (% by weight) | Third component (% by weight) | Permeability to oxygen, ml · mm/ m² · atm · 24 hours |
|---|---|---|---|
| 51 | S-1 (15) S-2 (0.3) | Ethylene-vinyl acetate copolymer* (25) Diallyl maleate (0.075) | 120 |
| 52 | S-18 (2) | 2-Ethylhexyl acrylate (18) | 240 |
| 53 | S-21 (2) | Butyl acrylate (28) | 160 |
| 54 | S-22 (5) | 2-Ethylhexyl acrylate (10) | 75 |
| 55 | S-49 (10) | Vinyl acetate (15) | 80 |
| 56 | S-50 (5) | 2-Ethylhexyl acrylate (20) | 210 |
| 57 | The copolymer prepared in Example 42 (40) |  | 200 |

*Content of ethylene 40% by weight

What is claimed is:

1. A method for the preparation of a vinyl chloride-based composite polymeric material having a high permeability to oxygen and comprising from 50 to 99 parts by weight of a vinyl chloride moiety and from 1 to 50 parts by weight of an organosilicon moiety which comprises copolymerizing vinyl chloride monomer and an organosilicon compound having at least one ethylenically unsaturated polymerizable group bonded to the silicon atom in a molecule, and selected from the group consisting of (I) an organosilicon compound represented by the formula $$CH_2=CR^1-CO-O-R^2-SiG_2(-O-SiR_2)_n R^3$$

in which
  $R^1$ is a hydrogen atom or an alkyl group having 1 to 3 carbon atoms,
  $R^2$ is a divalent organic group,
  G is a monovalent hydrocarbon group having 1 to 20 carbon atoms or an organosiloxy group represented by the formula $$(-O-SiR_2)_n R^3,$$

R is a monovalent hydrocarbon group having 1 to 20 carbon atoms,
  $R^3$ is a monovalent hydrocarbon group having 1 to 20 carbon atoms, a trimethylsiloxy group or a silyl-substituted ethyl group represented by the formula $$-CH_2-CH_2-SiR_2(-O-SiR_2)_n R^3,$$

and
  n is zero or a positive integer not exceeding 100;

(II) an organosilicon compound represented by the formula ACH=CHA, which may be a cis or a trans isomer in respect of the steric configuration and in which A is a silicon-containing group represented by the general formula $-CO-R^2-SiG_2(-O-SiR_2)_n R^3$, the symbols R, $R^2$, $R^3$, G and n each having the same meaning as defined above;

(III) an organosilicon compound represented by the formula $CH_2=CA-CH_2-A$, in which the symbol A has the same meaning as defined above; and (IV) a maleimido-containing organosilicon compound represented by the formula $Q-R^2-SiG_2(-O-SiR_2)_n R^3$, in which the symbols R, $R^2$, $R^3$, G and n each have the same meaning as defined above and Q is a maleimido group.

* * * * *